United States Patent [19]

Weber et al.

[11] Patent Number: 4,669,660

[45] Date of Patent: Jun. 2, 1987

[54] PULSE VALVE

[75] Inventors: Klaus Weber, Stutensee; Peter von Blanckenhagen, Bruchsal, both of Fed. Rep. of Germany

[73] Assignee: Kernforschungszentrum Karlsruhe, Fed. Rep. of Germany

[21] Appl. No.: 818,039

[22] Filed: Jan. 13, 1986

[30] Foreign Application Priority Data

Jan. 15, 1985 [DE] Fed. Rep. of Germany ....... 3501077

[51] Int. Cl.4 ............................................. F16K 31/02
[52] U.S. Cl. .............................. 239/102.2; 239/397.5; 239/584; 251/129.05; 251/129.06
[58] Field of Search ...................... 251/129.06, 129.05; 137/340; 239/584, 585, 397.5, 102

[56] References Cited

U.S. PATENT DOCUMENTS 3,055,631 9/1962 Kippenhan ..................... 251/129.06

FOREIGN PATENT DOCUMENTS 2425599 1/1980 Fed. Rep. of Germany ......................... 251/129.06
2094940 9/1982 United Kingdom ........... 251/129.06

Primary Examiner—Arnold Rosenthal

[57] ABSTRACT

A pulse valve having a valve body with a valve nozzle, a valve seat and a valve stem with a closing piece movably disposed in axial alignment with the valve seat for operating the valve and a valve drive including a stack of piezoelectric crystals arranged concentrically around the valve stem for operating the valve, the stack of piezoelectric crystals being supported by thermally and electrically insulating support members and being enclosed in a drive housing provided with means permitting evacuation thereof, the valve drive being separated from the valve body by a membrane mounted to the valve stem at the interface of the valve stem and forming a seal between the drive and the valve body to permit evacuation of the housing. The valve nozzle is provided with replaceable nozzle members with different nozzle openings.

4 Claims, 1 Drawing Figure

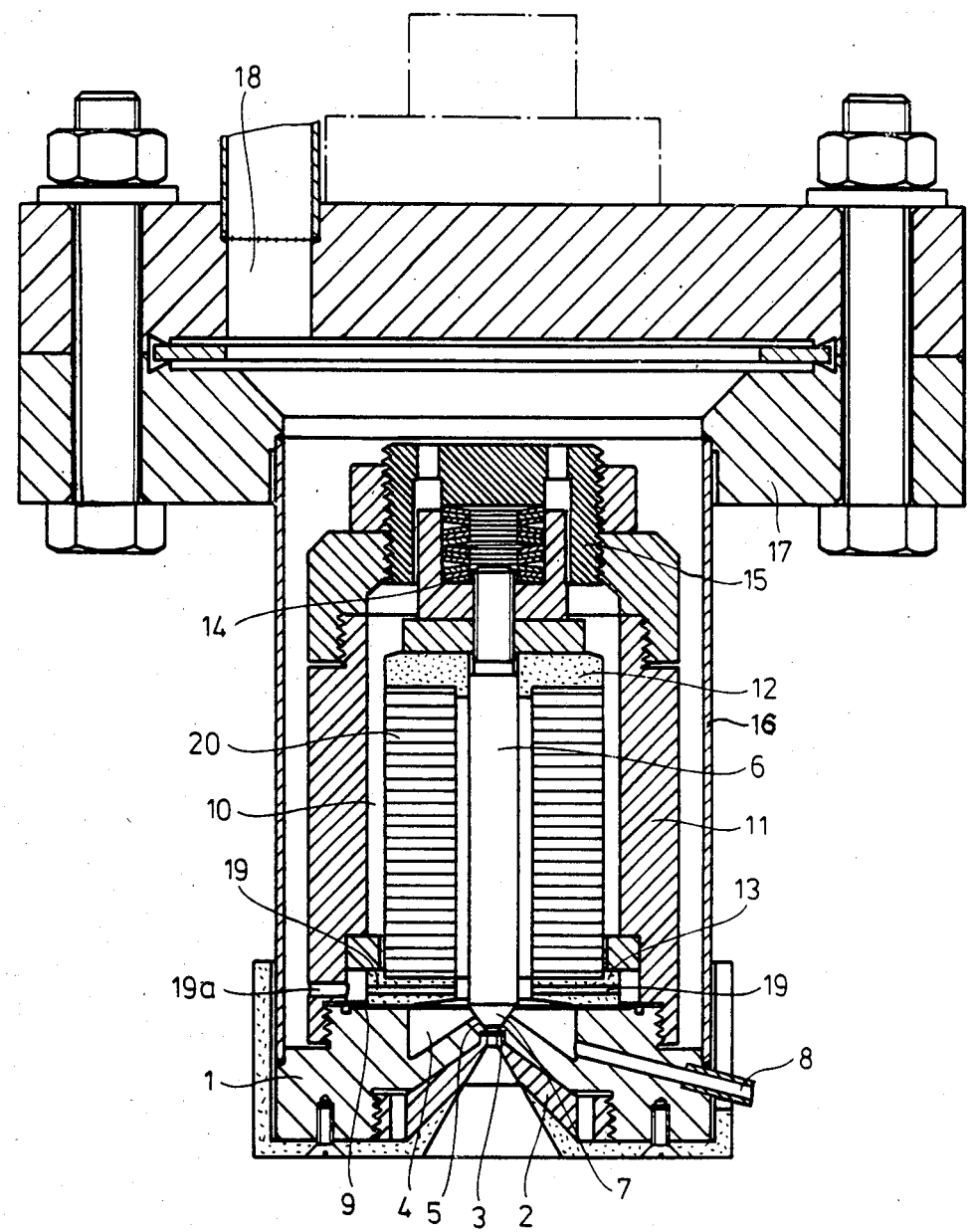

PULSE VALVE

The invention relates to a pulse valve.

In order to generate pulsed gas or liquid jets different versions of electromagnetically or piezoelectrically driven pulse valves are used.

From DE-PS No. 22 47 091 a high vacuum valve is known which is equipped with a drive body sealed against the valve body by a membrane. This is a dosage valve actuated by a driving screw, it being understood that a negative pressure prevails in the valve body and atmospheric pressure in the drive body.

The familiar valves carry the drawback that on account of their purpose design, they do not combine in one single design the three features:

high operating pressure,
short pulse duration,
great sequence of pulses, and are not applicable at extreme temperatures.

The task underlying the invention consists in providing a pulsed valve nozzle for an atomic beam spectrometer which is characterized by a variable pulse duration, a sequence of pulses up to 150 pulses/s, both heatability and coolability of the nozzle, and an operating pressure which can be set to a maximum of 50 bar.

The particular advantage of this design principle consists in the fact that the piezoelectric drive has not to perform against the operating pressure prevailing in the storage space. Therefore, a substantially higher operating pressure can be applied than in the previous pulsed nozzles.

The figure is a longitudinal section of a pulse valve in accordance with the invention.

The pulse valve consists of a valve body 1 with a nozzle body 2 dismountable on it face and the port of which can be provided with replaceable nozzle members 3 with nozzle openings of different diameter nozzle opening. The valve body 1 has a storage space 4 accomodating the valve seat 5 and the closing piece 7 connected with the valve stem 6 and is supplied via a connecting pipe section 8 with the gaseous, liquid or mixed gaseous liquid pressure medium. The valve stem 6 penetrates into the drive space 10 of the drive body 11 rigidly attached to the valve body 1, this drive space 10 being isolated so as to be vacuumtight from the storage space 4 by means of the membrane 9 and can be evacuated. A first thermally and electrically insulating body 12 connects the valve stem 6 with a piezoelectric drive 20 consisting of a stack of piezoelectric crystals, and is supported with respect to the valve body 1 via a second thermally and electrically insulating body 13. Besides, the valve stem 6 is connected with the drive body 11 via an elastic element 14 and an adjustment device 15. The drive body 11 is placed in a vaccumtight casing 16 which is connected on its lower end with the valve body 1 and is equipped at its upper end with a flange connection 17.

Both the casing 16 and the drive body 11 are evacuated via a pump nozzle 18 and the bores 19, 19a. The thermally and electrically insulating vacuum and the insulating bodies 12 and 13 protect the piezoelectric drive 20 from the extreme temperatures of the valve body 1 and the pressure medium present in the storage space 4 which, similar to the nozzle body 2, may be either heated or cooled. The pressure in the storage space 4, via the membrane 9 and the valve stem 6 connected with it, works against the spring force of the elastic element 14 consisting of disk springs. The disk spring design must be so resistant that with the adjustment device 15 a pressure can be set which corresponds to the sum of the maximum operating pressure in the storage space 4 and the pressure needed at minimum to close the valve stem 6.

List of Reference Numbers:
1—Valve body
2—Nozzle body
3—Nozzle member
4—Storage space
5—Valve seat
6—Valve stem
7—Closing piece
8—Connecting pipe section
9—Membrane
10—Drive space
11—Drive body
12—First thermally and electrically insulating body
13—Second thermally and electrically insulating body
14—Elastic element
15—Adjustment device
16—Casing
17—Flange connection
18—Pump nozzle
19—Bore
19a—Bore
20—Piezoelectric drive

What is claimed is:

1. A pulse valve for a fluid under pressure and at extreme temperatures, comprising: a valve body defining a storage space for the reception of said fluid and having a valve port extending from said storage space through said valve body and forming a valve seat, a valve drive comprising a valve stem movably disposed with one end thereof adjacent said valve port and having at its one end a closing piece adapted to be seated on, and biased toward, said valve seat for closing said valve port, a stack of piezoelectric crystals arranged concentrically around said valve stem and engaging said valve stem at its other end, the stack of piezoelectric crystals being supported by a thermally and electrically insulating support structure and having associated therewith means for applying a voltage to said crystals for operating said valve, a casing enclosing said stack of crystals and being sealed with said valve body and with a membrane extending across said casing adjacent said valve body storage space and being in enagement with said valve stem so as to separate said casing from said storage space to seal off said drive from said valve body, said casing having means permitting its evacuation, and a nozzle body mounted on said valve body and having a nozzle section projecting into said valve port and carrying a nozzle member such that said nozzle member is disposed in said valve port so as to facilitate replacement of said nozzle member.

2. A pulse valve according to claim 1, wherein spring elements are disposed between said support structure and said valve stem so as to compensate for any pressure applied to said stem and the membrane associated therewith by the fluid in said storage space.

3. Pulse valve as defined in claim 1 with the valve opening stroke determined by the number of the piezoelectric crystals of the drive and by variation of the voltage applied.

4. Pulse valve as as defined in claim 1 with the valve suitable for use with gases and liquids up to the temperature of liquid helium.

* * * * *